United States Patent [19]
Okamoto

[11] 4,408,138
[45] Oct. 4, 1983

[54] LINEAR STEPPER MOTOR

[75] Inventor: Takachiyo Okamoto, Nagoya, Japan

[73] Assignee: Brother Kogyo Kabushiki Kaisha, Nagoya, Japan

[21] Appl. No.: 245,958

[22] Filed: Mar. 20, 1981

[30] Foreign Application Priority Data

Apr. 15, 1980 [JP] Japan .................................. 55-50181

[51] Int. Cl.³ ............................................. H02K 41/00
[52] U.S. Cl. ........................................................ 310/12
[58] Field of Search ...................................... 310/12–14; 318/135

[56] References Cited
U.S. PATENT DOCUMENTS 3,292,065 12/1966 Frederickson ..................... 310/12 X
4,037,122 7/1977 Bonner et al. ..................... 310/12 X Primary Examiner—Donovan F. Duggan
Attorney, Agent, or Firm—Moonray Kojima

[57] ABSTRACT

A linear stepper motor comprising a stator bar having stator teeth and a slider having slider teeth. The slider is positioned under the stator bar. The surface of the stator bar opposed to the slider has a pair of flat portions with a predetermined width between the edges and the teeth. The flat portions serve as rail portions for the rollers mounted on the slider. On the surface of the stator bar extending between the pair of flat portions are formed a plurality of parallel grooves to provide a plurality of stator teeth. The surface of the stator bar is hardened by plating with a metallic material.

6 Claims, 6 Drawing Figures

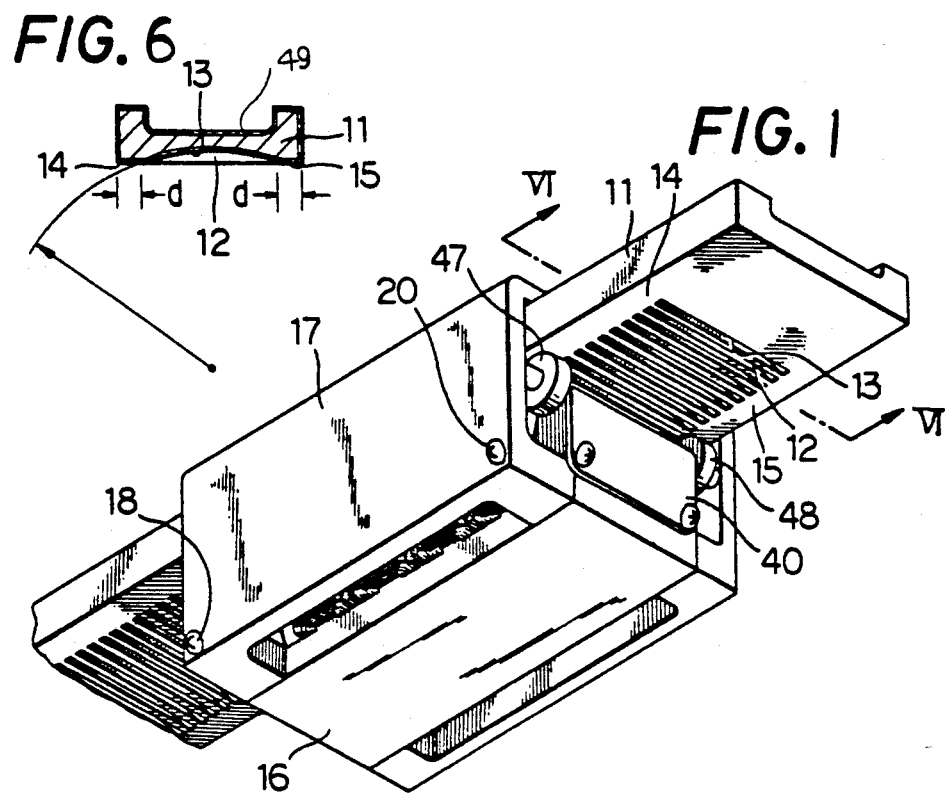

LINEAR STEPPER MOTOR

CROSS-REFERENCE TO RELATED APPLICATIONS

This application includes disclosure which is similar to that contained in a copending application Ser. No. 87,684, filed on Oct. 23, 1979 by the present inventor for LINEAR STEPPER MOTOR and assigned to the present assignee.

BACKGROUND OF THE INVENTION

1. Field of Invention

This invention relates to improvements in linear stepper motors and more particularly to such linear stepper motors having a statorbar with a slider movably mounted on the statorbar.

2. Description of the Prior Art

Known linear stepper motors usually comprises a stator bar having a plurality of stator teeth disposed at equal intervals in a longitudinal direction and a slider having a plurality of slider teeth opposed to the stator teeth with a small gap therebetween. It is important that the stator teeth and the slider teeth be kept accurately as close to each other as possible without physical contact. Therefore, a pair of flat rail portions are provided on the stator bar and a plurality of rollers are supported on the slider for engaging with the rail portions and for maintaining the fixed small gap between the stator teeth and the slider teeth during movement of the slider.

Also, it is desirable for the characteristics and the efficiency of such linear stepper motors and for the manufacturing thereof, that the stator teeth and slider teeth be formed of a high permeability magnetic material, such as a soft steel containing a low percentage of carbon, which soft steel is mild and may be readily cut or ground. It is further desirable from the view point of manufacturing cost, that the stator teeth and the rail portions be formed of one body, such as by cutting and/or grinding one surface of the stator bar made of such material.

One deficiency of such prior motors is that during the motion of such linear stepper motor, the rail portions are often subjected to large loads which are concentrated through the rollers, because an attractive magnetic force occurs between the stator teeth and the slider teeth. The concentrated load may be about ten times as large as the driving force of such linear stepper motor. Moreover, the rail portions are subjected to another irregular shock resulting from the characteristic step-by-step movement of the stepper motor. Thus, the rail portions of the stator bar are caused to become uneven by the aforementioned large load and irregular shock. Hence, the predetermined small gap between the stator teeth and the slider teeth may become reduced little-by-little, or the distance between the two may become different at different parts of the rail portions. As a result, the characteristics and efficiency of the stepper motor tend to become increasingly inferior with continued use. In the worst case, the slider teeth may even be caused to physically contact the stator teeth, when the slider is magnetically attracted toward the stator bar.

To eliminate such deficiencies, it would be better to form the rail portions of another considerably harder material and to attach same to the stator bar. But, such a solution is not feasible since it is difficult and very complicated to make such parts of the motor of such material, and to construct an entire motor unit of such material and concurrently provide for regulating accurately the gap between the stator teeth and the slider teeth and for keeping such gap constant. It is desirable that the gap between the stator teeth and the slider teeth be as small as possible and as uniform as possible, in any position, for example, between 0.03 and 0.1 millimeters (mm) during the movement of the slider.

SUMMARY OF THE INVENTION

It is an object of this invention to provide an improved linear stepper motor.

It is another object to provide a linear stepper motor having a /stator bar which may be manufactured easily.

It is a further object to provide a linear stepper motor, wherein the gap between the stator teeth of the stator bar and the slider teeth of the slider is kept substantially constant.

It is a still further object to provide a linear stepper motor which is substantially free from the influence of dust.

The foregoing and other objects are attained in the invention linear stepper motor comprising a stator bar having a plurality of stator teeth disposed at substantially equal intervals in a longitudinal direction, and a slider having a plurality of slider teeth disposed to be opposite of the stator teeth with a small predetermined gap therebetween with rollers mounted on the slider. One surface of the stator bar has formed therein a plurality of parallel grooves to provide a plurality of stator teeth, with flat portions of predetermined spacing adjacent both side edges and on both sides of the stator teeth, forming rail portions on which the slider rollers may coact therewith. The stator bar is made of a high permeability magnetic material, such as a soft steel which is mild and suitable to be cut and ground. The parallel grooves in the stator bar are preferably formed in such a manner that the depth of each groove gradually increases toward the center of the teeth portion from the two rail portions on either side. The teeth portion and the rail portions of the stator bar may be formed on a lower surface of the stator bar. Then, the surface of the stator bar is hardened by chemically plating with a hard metallic material, such as a nickel compound or the like.

BRIEF DESCRIPTION OF THE DRAWINGS

FIG. 1 is a perspective view of an embodiment of the invention;

FIG. 6 is a partially exaggerated section view of the motor of FIG. 1 taken along the line VI—VI.

DESCRIPTION OF THE PREFERRED EMBODIMENTS

Figure 3:
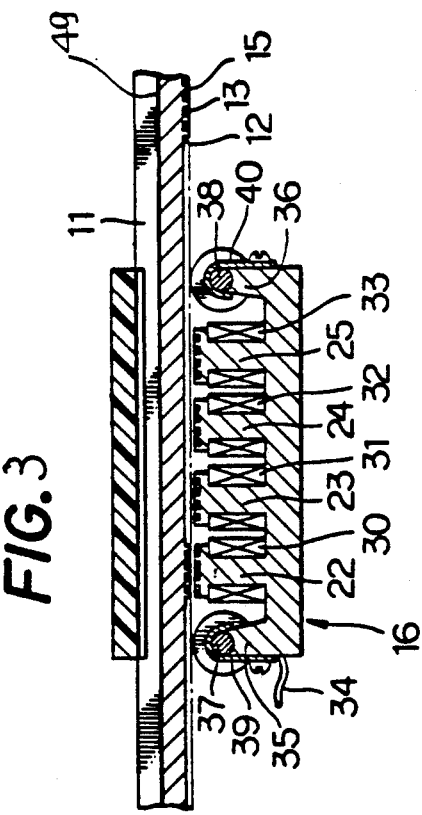
FIG. 3 is a sectional view of the motor of FIG. 2 taken along the line III—III.
Figure 2:
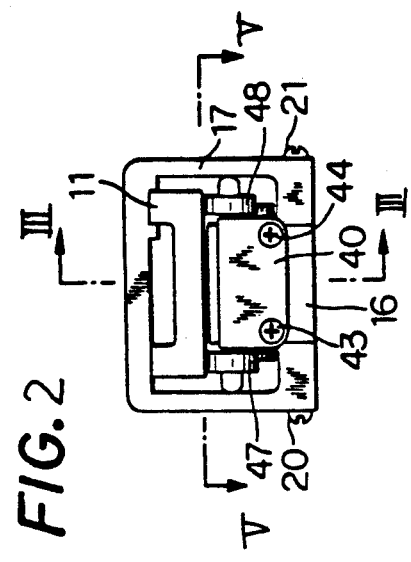
FIG. 2 is a side view of the motor of FIG. 1, seen from the right side.
Figure 5:
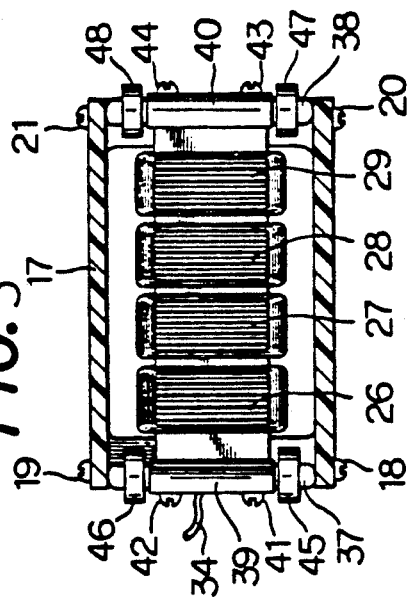
FIG. 5 is an under view of the motor of FIG. 1.
Figure 4:
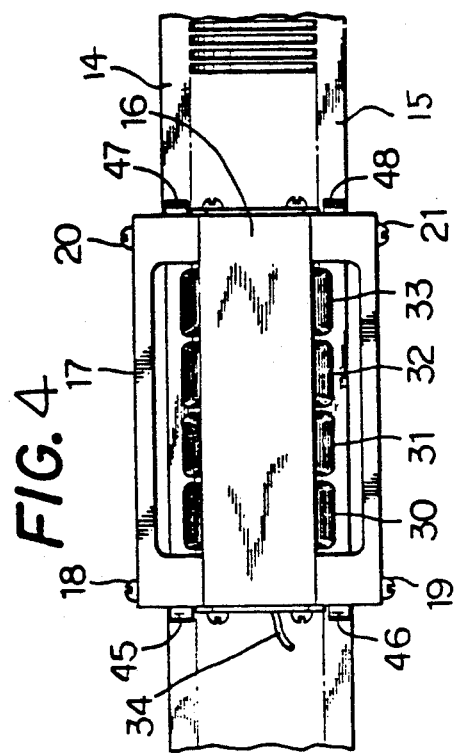
FIG. 4 is a sectional view of the motor of FIG. 2 taken along the line IV—IV.

A preferred embodiment of the inventive linear stepper motor is shown in FIGS. 1 through 6. A stator bar 11 is provided on the lower surface thereof with a plurality of stator teeth 12 which are disposed at substantially equal intervals in a longitudinal direction. Each pitch between adjoining stator teeth 12 is proportional to a minimum distance of the motion of this motor. The stator bar 11 is made of a high permeability magnetic material, such as soft steel containing an extremely low percentage of carbon, which soft steel is mild and suitable for cutting and/or grinding.

The stator teeth 12 are formed by making a plurality of parallel grooves 13 on the lower surface (for the orientation depicted in FIG. 1) of the stator bar 11 so as to leave a predetermined spacing "d" (see FIG. 6) from both side edges. The grooves 13 may be easily formed by a milling machine or the like provided with a cutter which rotates about a point as the center. They are formed so as to assume circular arcs in planes transverse to the longitudinal direction of the stator bar 11. On both sides of the stator teeth 12 are formed a pair of rail portions 14 and 15 which are substantially flat.

After the stator teeth are formed, the surface of the stator bar 11 is chemically plated with a nickel compound (by an electrolysis plating process), and then is treated with heat at about 400° C. for about one hour. As a result, the stator bar 11 is covered with a lamina 49 (exaggeratedly shown in FIG. 6) formed of nickel, which has a thickness of about five microns ($5\mu$). The hardness of the lamina 49 is about Vickers hardness 1,000 (measured by using a Vickers diamond pyramid hardness test) and is much harder than that of soft steel which has a hardness of about Vickers hardness 100. Therefore, although the stator bar 11 which is formed of soft steel, is mild, its surface having the coated lamina 49 thereon, is very hard. Thus, the rail portions 14 and 15, which are coated with the lamina 49, are not easily worn out or made uneven by the aforementioned large loads and irregular shock. Such lamina 49 may be exactly and easily formed to a thickness of one micron ($1\mu$), and has no substantial effect on the dimensions and magnetic characteristics of the stator bar 11 which is otherwise of soft steel. Moreover, this coating 49 is useful in preventing the surface of the stator bar 11 from rusting. Instead of employing such a plating process using a nickel compound, other hard coatings or lamina may be formed on the stator bar 11 by electroplating process using other types of materials, such as chromium compound or the like; or by spraying such other materials on the stator bar surface. The resulting electroplated or sprayed surface may not be smooth or uniform, such as when chemically plated, and thus it may be necessary to grind or otherwise smooth the coated surface.

A slider 16 (see FIG. 1) is formed of a high permeability magnetic material, such as soft steel having only a small amount of carbon, and is slidably held under the stator bar 11 by a frame 17, which may be formed of a synthetic resin. The frame 17 is fixed to the slider 16 with screw 18 through 21 (see FIG. 5). Salient poles 22 through 25 (see FIG. 3) for various phases, are formed integrally with the slider 16 and are provided on their surfaces, opposite the stator teeth 12, with a plurality of respective slider teeth 26 through 29 (see FIG. 5). Each pitch between adjacent teeth of respective slider teeth 26 through 29 is correlated to the pitch of the stator teeth 12. On the salient poles 22 through 25 are wound exciting windings 30 through 33, respectively (see FIG. 3), which are connected to a conductor 34. At the front and rear ends in the direction of movement of the slider 16 (in the figure left to right) are formed protrusions 35 and 36 (see FIG. 3) on the surface of which, opposed to the stator bar 11, are positioned shafts 37 and 38, by retaining means 39 and 40 which are held in place with screws 41 through 44 (see FIG. 5). On both ends of the shafts 37 and 38 are mounted metallic hard rollers 45 through 48 via ball bearings. The rollers 45 through 48 are adapted to engage with rail portions 14 and 15 of the stator bar (see FIG. 4). Since the lower surface of the rail portions 14 and 15 and that of the stator teeth 12 are aligned on the same plane, it is possible to apply cutting and grinding to both surfaces concurrently. Consequently, high machining accuracy may be easily attained, whereby a predetermined small gap may be exactly obtained between the slider teeth 26 through 29 of the slider 16 guided by the rail portions 14 and 15, and the stator teeth 12 of the stator bar 11. The term lower surface of the stator bar is in connection with the orientation depicted in FIG. 1. In other orientations, the surface may be designated as side surfaces, etc.

When driving pulse signals are transmitted from a control means, not shown, to the conductor 34 and hence successively to the exciting windings 30 through 33, the slider 16 moves in a predetermined direction along the stator bar 11 in the same manner as in conventional linear stepper motors. In this case, the slider teeth 26 through 29 are attracted upwards by the stator teeth 12 of the stator bar 11, so that the rollers 45 through 48 move on the rail portions 14 and 15 of the stator bar 11, while being given the aforementioned large load through the rollers 45 through 48. However, since the surface of the rail portions 14 and 15 are covered by the lamina 49, and hence are very hard, and cannot be worn out or made uneven, the predetermined small gap between the stator teeth 12 and the slider teeth 26 through 29 remain constant.

It is further understood by those skilled in the art that the foregoing description is a preferred embodiment of the invention, and that various changes and modifications may be made in the invention without departing from the spirit and scope of the invention.

What is claimed is:

1. In a linear stepper motor including
    a stator bar having teeth portion along a longitudinal axis thereof, and a pair of rail portions which are provided on both sides of said teeth portion;
    said teeth portion having a plurality of stator teeth transverse to said longitudinal axis, with a pitch proportional to a minimum distance of the motion of said motor; and
    a slider movably mounted on said stator bar;
    said slider including a plurality of rollers engagable with said rail portions, an armature formed with poles having surfaces cooperative with said teeth portion of said stator bar, and windings on said poles;
    said pole surfaces having teeth with a pitch correlated to the pitch of said stator teeth and being opposite to said teeth portion of said stator bar with a predetermined small gap therebetween when said rollers engage with said rail portions;
    the improvement wherein said teeth portion and said rail portions are formed on one surface of said stator bar, said stator bar being made of soft steel having high permeability magnetic properties, said rail portions being covered with metallic material which is substantially harder than said soft steel, and wherein said metallic material is chemically plated with a nickel compound thereby to form a nickel coating on said rail portions.

2. The motor of claim 1, wherein said stator bar is substantially coated with said nickel.

3. The motor of claim 2, wherein said stator bar comprises the top of said stator teeth and said rail portions are aligned in the said plane, said stator teeth being formed due to formation of uniformly spaced parallel grooves transverse to the longitudinal axis of said stator bar and between said both rail portions, and the depth of said each groove gradually increasing toward the center of said teeth portion away from said each rail portion.

4. The motor of claim 3, wherein said stator teeth portion is located on the lower surface of said stator bar.

5. The motor of claim 4, wherein said stator bar is substantially coated with said hard metallic material.

6. The motor of claim 5, wherein said metallic material is chemically plated with a nickel compound thereby to form a nickel coating on said stator bar.

* * * * *